United States Patent
Boutaghou et al.

(10) Patent No.: US 6,333,836 B1
(45) Date of Patent: Dec. 25, 2001

(54) HEAD SUSPENSION ASSEMBLY FOR A DATA STORAGE DEVICE

(75) Inventors: Zine-Eddine Boutaghou, Vadnais Heights; Aric Kumaran Menon, Bloomington, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/204,804

(22) Filed: Dec. 3, 1998

Related U.S. Application Data

(60) Provisional application No. 60/067,696, filed on Dec. 4, 1997.

(51) Int. Cl.$^7$ .................................................. G11B 5/60
(52) U.S. Cl. .............................. 360/235.7; 360/236.5; 360/234.7
(58) Field of Search .......................... 360/234.3, 234.6, 360/234.7, 234.9, 235.4, 235.7, 236.5, 245, 245.1

(56) References Cited

U.S. PATENT DOCUMENTS

| | | | |
|---|---|---|---|
| 3,197,751 | * 7/1965 | Felts | 360/235.4 |
| 3,528,067 | * 9/1970 | Linsley et al. | 360/235.4 |
| 3,678,482 | 7/1972 | Billawala | 360/103 |
| 4,285,019 | 8/1981 | Scott et al. | 360/237 |
| 4,420,780 | 12/1983 | Deckert | 360/235.8 |
| 5,266,769 | 11/1993 | Deshpande et al. | 219/121.69 |
| 5,469,312 | * 11/1995 | Watanabe et al. | 360/234.7 |
| 5,687,042 | * 11/1997 | Chhabra et al. | 360/234.6 |
| 5,886,856 | * 3/1999 | Tokuyama et al. | 360/236.5 |
| 5,898,542 | * 4/1999 | Koshikawa et al. | 360/234.7 |
| 5,991,113 | * 11/1999 | Meyer et al. | 360/234.7 |
| 5,991,119 | * 11/1999 | Boutaghou et al. | 360/234.7 |

* cited by examiner

*Primary Examiner*—David L. Ometz
(74) *Attorney, Agent, or Firm*—Westman, Champlin & Kelly, P.A.

(57) ABSTRACT

A head suspension assembly including a head and a suspension coupled to the head to support the head to fly above the disc surface for operation. The head includes a slider having a bearing surface and a transducer having a transducer element. The suspension supports the head at a pitch angle determined so that close point between the head and disc surface is located at the slider spaced from the transducer. In one embodiment of the head suspension, the suspension supports the head during operation at a pitch angle $\theta_P \leq (d_R - d_W)/d_{A-B} - 4\,d_C/l$ to avoid transducer contact with media asperities with mean roughness.

12 Claims, 7 Drawing Sheets

HEAD SUSPENSION ASSEMBLY FOR A DATA STORAGE DEVICE

CROSS-REFERENCE TO RELATED APPLICATION

The present application claims priority to U.S. Provisional Application Ser. No. 60/067,696, entitled "PROXIMITY MR CONCEPT: DISPLACED CONTACT CONCEPT," filed Dec. 4, 1997.

BACKGROUND OF THE INVENTION

The present invention relates to data storage systems. In particular, the present invention relates to a head suspension assembly for supporting transducers for reading and writing information to a data disc.

Data storage systems are known which include transducers supported relative to a disc surface for reading and writing information. Known transducer elements include inductive-type transducers and magnetoresistive ("MR") transducer elements. The transducers are supported via a slider coupled to a suspension assembly. The slider includes a bearing surface for lifting the slider above the disc surface. As the disc spins, air flows under the bearing surface to raise the slider (and transducer elements) relative to the disc surface to fly over the disc surface for read and write operations. The suspension assembly includes a load beam which supplies a load force to counter the hydrodynamic lifting force to provide a stable lift height and pitch angle for operation of the slider.

It is important for operation that the slider fly in close proximity to the data surface to provide the desired resolution. During operation of a disc drive, the slider may contact or slap the disc media due to vibration or shock. Contact of a slider with a disc surface may wear the slider and may damage the transducer elements of the slider. Contact between a magnetoresistive head and a disc surface may cause thermal asperities corrupting signals read from the disc surface. Thus it is desirable to limit contact of transducer elements supported at a trailing edge of the slider while providing desired read/write resolution for operation of the disc drive.

SUMMARY OF THE INVENTION

The present invention relates to a head suspension assembly including a head having a transducer and suspension means for supporting the head to fly above the disc surface for operation of a transducer element of the transducer. The suspension means supports the head to limit contact interface between the transducer and disc surface of the disc. In a preferred embodiment of the head, the suspension means supports the head during operation at a pitch angle $\theta_P \leq (d_R - d_W)/d_{A-B} - 4d_C ]$ to avoid transducer contact with media asperities with mean roughness.

DETAILED DESCRIPTION OF THE PREFERRED EMBODIMENTS

Figure 1:
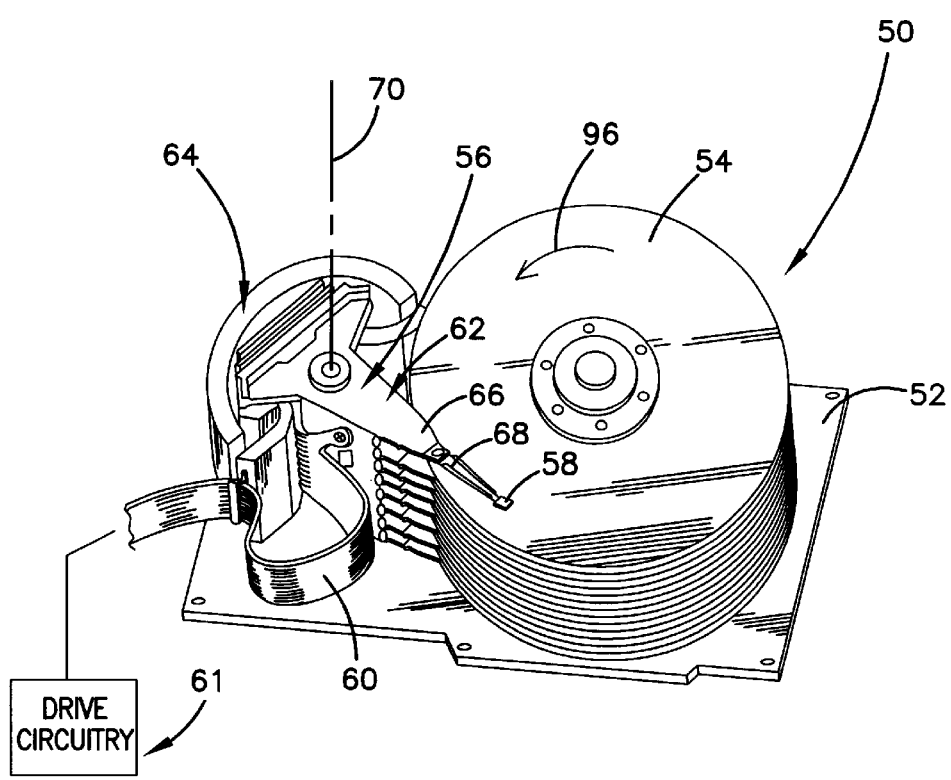
FIG. 1 is a perspective view of a data storage system.

The present invention relates to a data storage system and, in particular, has applications to a disc drive 50 for storing digital information as shown in FIG. 1. As shown, disc drive 50 includes a base 52, a disc stack 54, and rotary actuator 56, which supports heads 58 relative to surfaces of discs of disc stack 54 to read and write information to and from discs. Heads 58 are coupled to a flex circuit 60, which is coupled to circuitry 61 of the disc drive for read and write operations.

Figure 2:
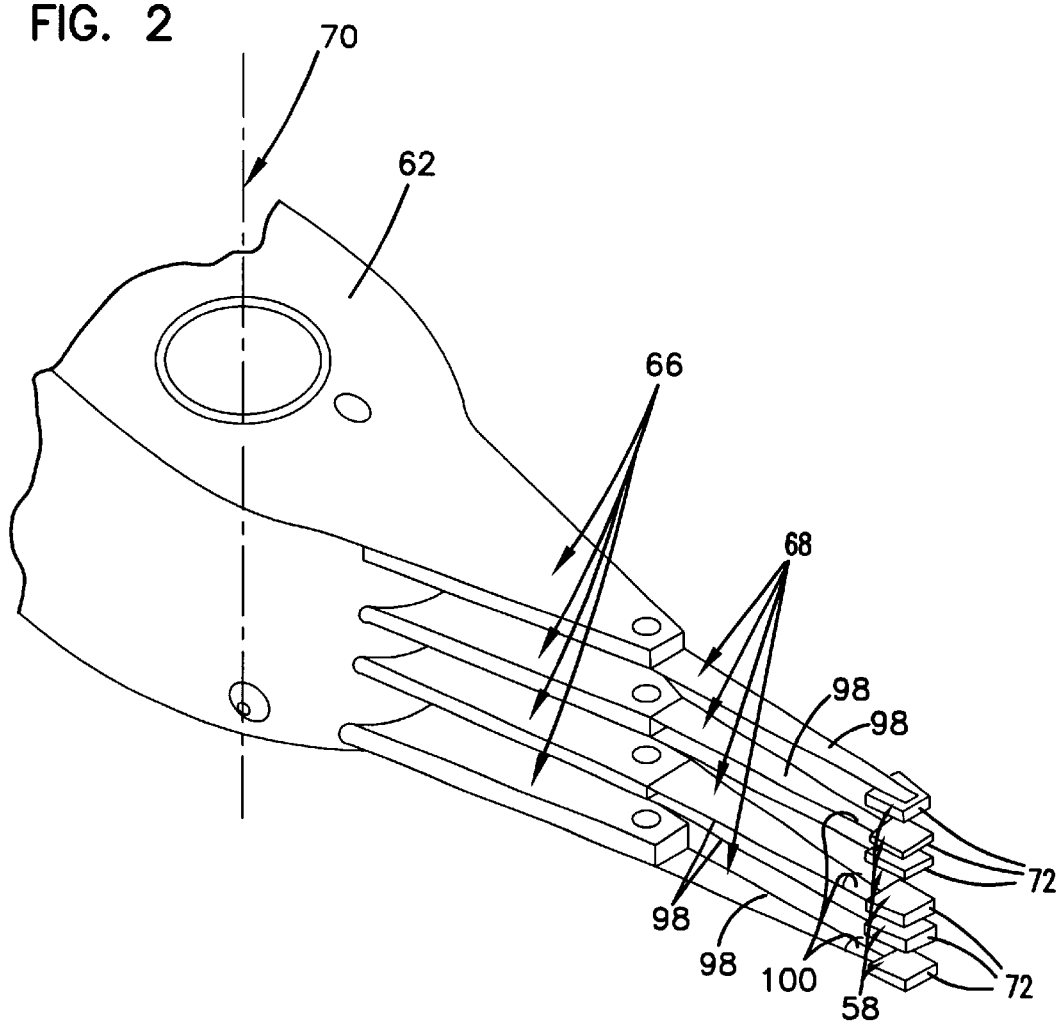
FIG. 2 is a perspective view of an actuator block supporting heads for operation of a data storage system.

In particular, in the embodiment shown, the rotary actuator 56 includes an actuator block 62 and a voice coil motor 64 for movement. Heads 58 are supported relative to the actuator block 62 via a plurality of stacked actuator arms 66. The heads 58 are coupled to the actuator arms 66 via suspension assemblies 68 in a known manner. Operation of the disc drive rotates the actuator block 62 about an axis 70 for positioning heads 58 relative to selected data tracks on the disc surface via operation of the voice coil motor 64. FIG. 2 is a detailed perspective view of the actuator block 62, which illustrates heads 58 supported via suspension assemblies 68 coupled to actuator arms 66 to define head suspension assemblies. As shown, heads 58 include a slider 72, which supports transducer elements for read and write operations.

Figure 3:
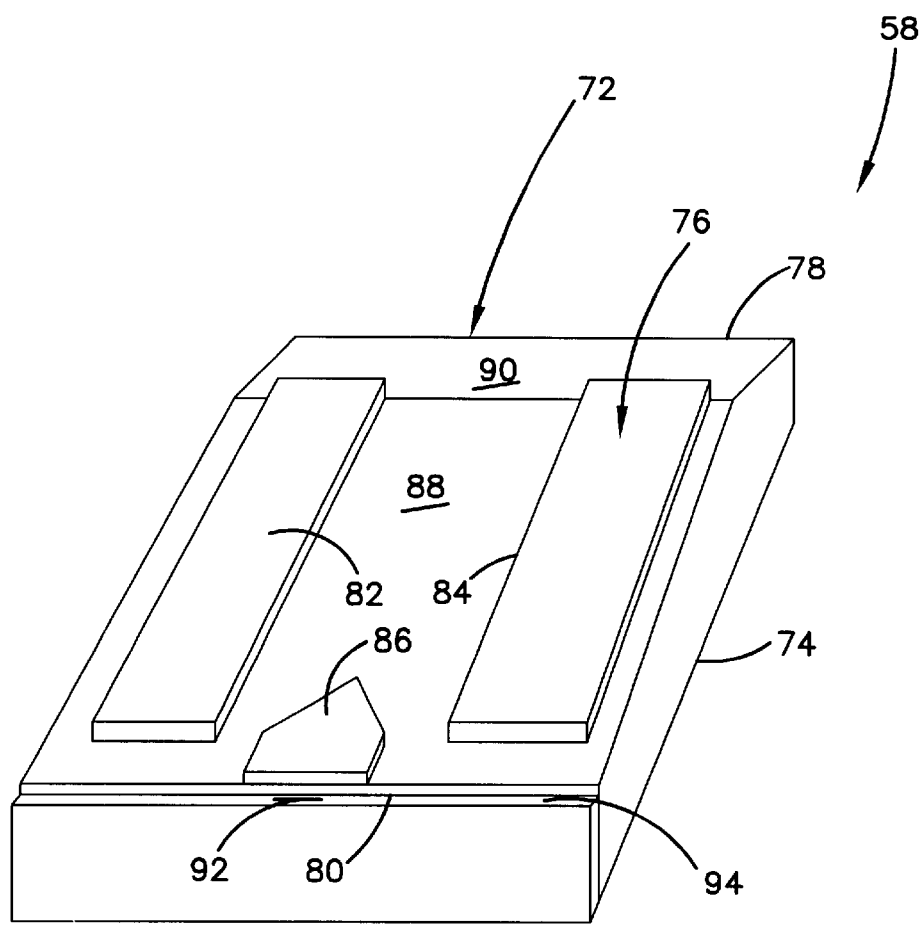
FIG. 3 is a perspective view of a head.

FIG. 3 illustrates an embodiment of a head 58 including slider 72. Slider 72 includes an upper surface 74, an air bearing 76, a leading edge 78, and a trailing edge 80. As shown, bearing 76 includes raised side rails 82, 84, and center rail 86 forming the bearing surfaces of the bearing 76. Raised side rails 82, 84 and center rail 86 are elevated above a recessed bearing cavity or base 88. The bearing 76 also includes a tapered edge 90 at leading edge 78 for providing lift for "take-off" from the disc surface in a known manner. The slider is formed of a ceramic substrate material, such as a mixture of TiC (Titanium Carbide) and Alumina ($Al_2O_3$), or other known slider materials. The bearing surfaces (side rails 82, 84; center rail 86; and surface 90) are formed by known subtractive masking techniques such as milling or chemical etching.

Transducer elements 92 (illustrated diagrammatically) are supported proximate to the trailing edge 80 of the slider to form head 58. Transducers may be inductive-type transducers or magnetoresistive-type ("MR") transducers. Preferably, transducer elements 92 are embedded in an Alumina layer to form the transducer 94 which is deposited on the trailing edge 80 of the slider via known deposit techniques.

Slider 72 is coupled to suspension assembly 68 at upper surface 74 of the slider so that air bearing 76 faces the disc surface. As the disc rotates, the disc pulls a very thin layer of air beneath the air bearing surface, which develops a lifting force that causes the slider 72 to lift and fly several microinches above the disc surface. In particular, skin friction on the air bearing surfaces causes air pressure to develop between the disc and the air bearing surfaces to provide lift to the slider to raise the slider to fly above the disc surface for proximity recording. The disc rotates as illustrated by arrow 96 of FIG. 1 to cause air to flow from leading edge 78 to trailing edge 80 for flying operations of heads 58.

Figure 4:
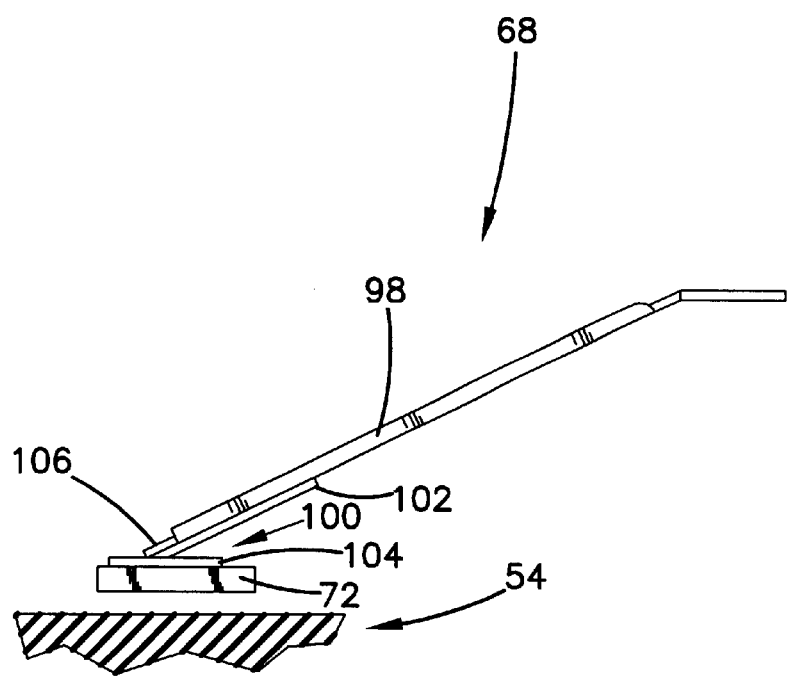
FIG. 4 is a side illustrative view of a head suspension assembly.

The slider is supported via the suspension assembly to fly at a pitch angle relative to the disc surface 54. FIG. 4 illustrates the slider 72 supported via a load beam 98. Load beam 98 is secured to actuator arm 66 (not shown in FIG. 4) to form a portion of the suspension assembly 68. The slider 72 is flexibly supported relative to the load beam 98 via a gimbal spring 100 in a known manner. In particular, the gimbal spring 100 includes a portion 102 coupled to load beam 74 and a tab portion 104 coupled to slider 72. Tab 104 is flexibly coupled to portion 102 to flexibly support the slider 72 secured to tab portion 104 to allow the slider to pitch and roll relative to the disc surface. An extended end 106 of load beam defines a load point for loading slider 72 to bias the slider toward the disc surface. End 106 defines a point about which the slider 72 pitches. Thus, pitch angle of slider may be adjusted by shifting the load point position of the load beam 98 on the slider 72

Figure 7:
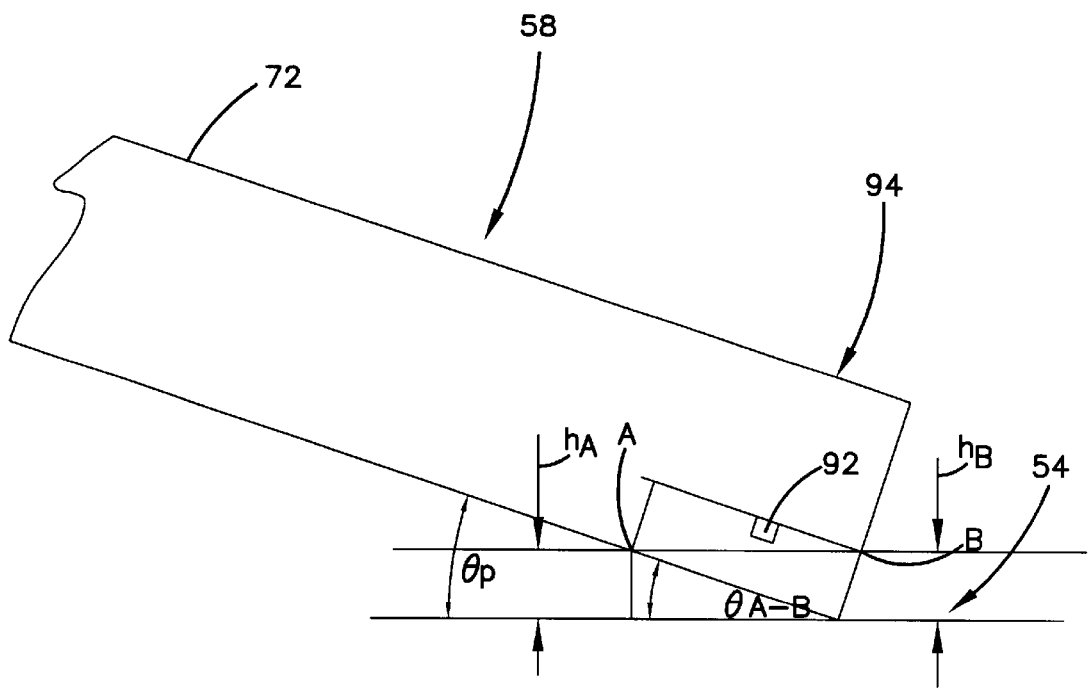
FIG. 7 is similar to FIGS. 5–6 with the head shown at a pitch angle $\theta p = \theta_{A-B}$.
Figure 5:
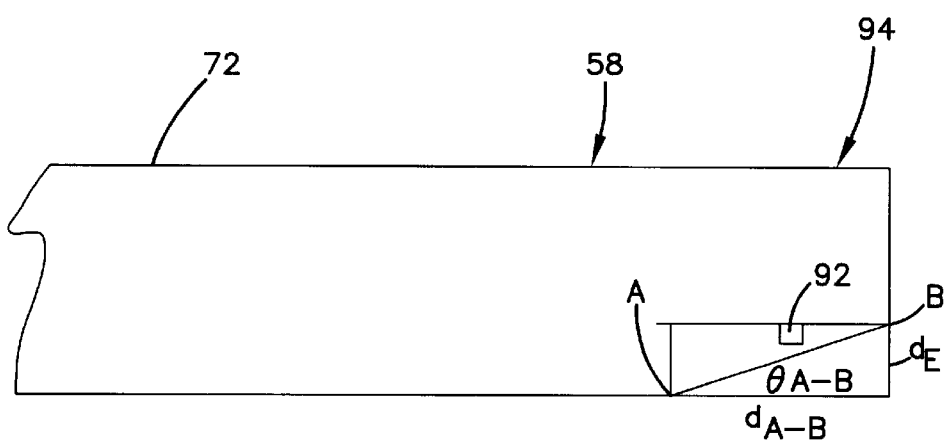
FIG. 5 is a side illustrative view of a trailing edge portion of a head illustrating a recessed transducer supported via a slider.
Figure 6:
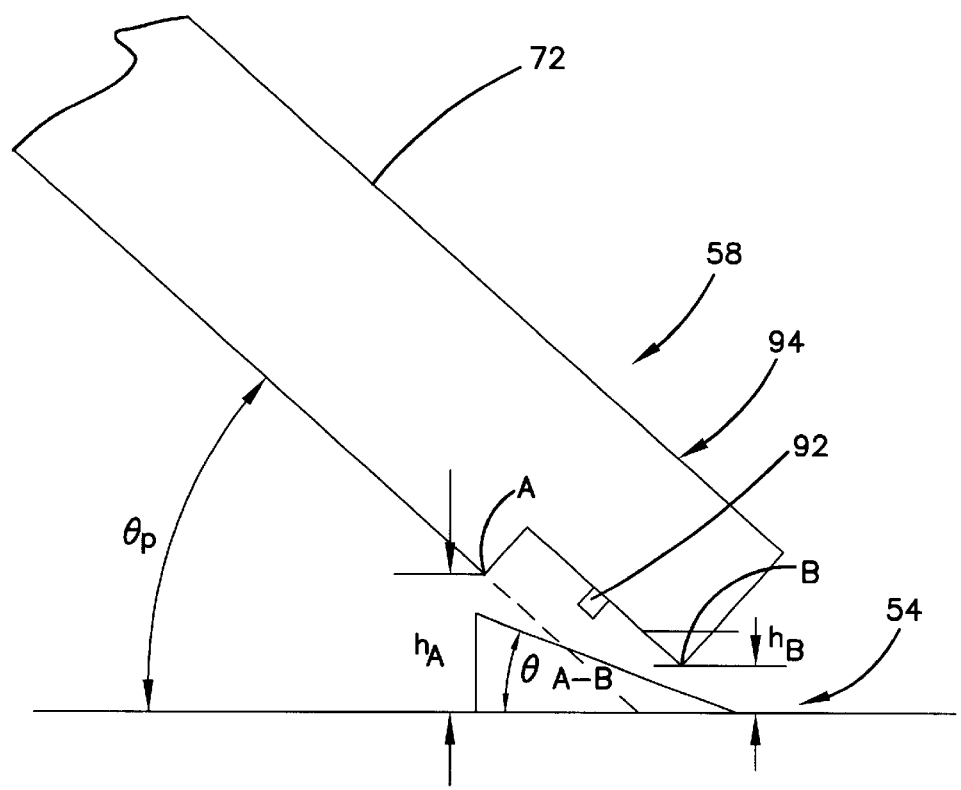
FIG. 6 is similar to FIG. 5 with the head shown at a pitch angle $\theta_p$.

FIGS. 5–7 are exaggerated views of a trailing end portion of the head 58. The transducer 94 is recessed from the bearing surfaces (side rails 82, 84 and center rail 86) a distance $d_R$ as illustrated in FIG. 5. The trailing edge portions of the lower surface of the slider and transducer 94 are referenced as Point A and Point B respectively. The longitudinal distance between Point A and Point B is defined as $d_{A-B}$.

The angle $\theta_{A-B}$ defining the relationship between Point A of the slider and Point B of the recessed transducer as illustrated in FIG. 5 is provided by:

$$\text{Tan } \theta_{A-B} = d_R/d_{A-B}$$

where:
  $d_R$—is the dimension of the recess of the transducer from the bearing surface of the slider; and
  $d_{A-B}$—is the distance between the slider Point A and the transducer Point B.

Since $\theta$ is relatively small, tan $\theta \approx \theta$ so that $\theta_{A-B} = d_R/d_{A-B}$. For desired clarity, it is desirable that transducers elements 92 be positioned in close proximity to the disc surface 54. This is particularly important for operation of MR transducers. During operation, the slider may contact the disc surface. The head generally contacts the disc surface at a close point of the head and disc surface. Close point refers to the lowest or closest position of the head relative to the disc surface. In past slider designs the transducer is the close point for desired operation clarity.

FIG. 6 illustrates a head similar to that shown in FIG. 3 flying at a pitch angle $\theta_P$. At the pitch angle $\theta_P$ shown, Point B of the transducer defines the close point relative to the disc surface, since at $\theta_P$, $h_B$ (height of Point B) is less than $h_A$ (height of Point A). Since the transducer defines the close point, the transducer generally contacts the disc surface during shock or head slap thus wearing the Alumina or protective layer encapsulating the transducer elements. Contact between an MR head and disc surface causes thermal asperities degrading read operations by corrupting the signal from the transducer.

Thus it desirable to limit contact interface between the transducer and disc surface. Various techniques have been proposed to limit damage to the transducer elements via contact between a head and disc surface. The present invention provides a head suspension assembly which supports transducer elements proximate to the disc surface for desired read and write clarity and provides increased protection for the transducer elements of a head and reduces thermal asperities for an MR head. The head suspension of the present invention includes a suspension assembly supporting the head to fly at a pitch angle $\theta_P \leq \theta_{A-B}$ determined as follows:

$$\theta_P \leq d_R/d_{A-B}$$

$\theta_P$ is calculated so that Point A of the slider provides a desired contact interface removed from the transducer elements as illustrated in FIG. 7. Thus, as illustrated the height of Point B from the disc surface is greater than or equal to Point A or $h_B \geq h_A$ so that Point A provides a contact interface for reducing thermal asperities and head damage.

Figure 8:
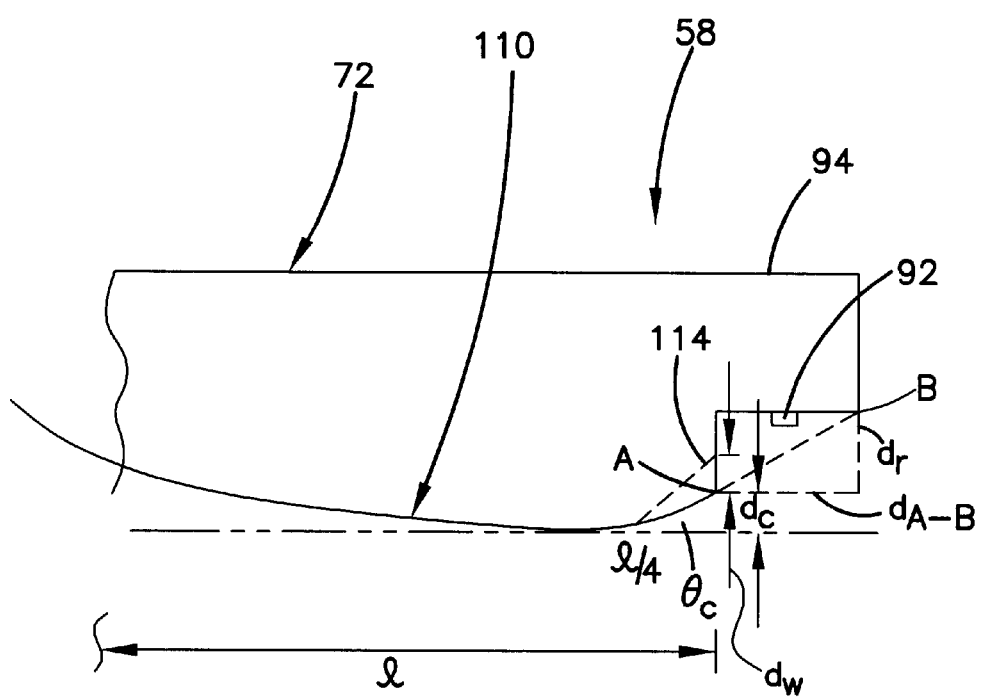
FIG. 8 is a side illustrative view of a trailing end portion of a head having a crown.

As illustrated in FIG. 8, sliders tend to have a curvature or crown 110 (which is greatly exaggerated in FIG. 8) due to stresses introduced during the fabrication process. The crown 110 is aligned along the longitudinal axis (extending from the leading end to the trailing end of the slider) so that the trailing edge 80 is arched relative to a portion of the slider. As shown in FIG. 8, angle $\theta_C$ is the angle of the crown, as provided by:

$$\text{Tan } \theta_C = (d_C l/4) \text{ or } 4d_C/l$$

where:
  $d_C$—is the dimension of the crown as illustrated in FIG. 8; and
  l—is the length of the slider and 1/4 approximates the distance of the crown at the trailing end of the head.

Since $\theta$ is small, Tan $\theta_C$ is approximated by $\theta_C$ so that $\theta_C = 4d_C/l$. In a preferred embodiment of the head suspension assembly of the present invention, $\theta_P$ is determined to compensate for the crown, as follows:

$$\theta_P \leq d_R/d_{A-B} - 4d_C/l$$

so that $h_A$ of Point A is equal to or less than $h_B$ of Point B so that the slider (Point A) is the close point for contact interface. Preferably $\theta_P$ approximates $d_R/d_{A-B} - 4d_C/l$ so that the transducers fly at an optimum distance from the disc surface for optimum resolution. During operation of the slider, repeat or continued contact of the slider with the disc surface at Point A tends to wear slider at Point A as illustrated by dashed line 114 in FIG. 8. Wear of the slider at Point A alters the close point or geometry of the contact interface of the slider. Thus, the pitch angle may be designed to compensate for wear in to maintain the contact interface at Point A away from the transducer at Point B. Thus, in a preferred embodiment of the present invention, $\theta_P$ is determined as follows:

$$\theta_P \leq (d_R - d_W)/d_{A-B} - 4d_C/l$$

where:
  $d_R$—is the dimension of the recess between Point A of slider and Point B of transducer;
  $d_W$—is the wear height reducing the recessed dimension of the transducer;
  $d_{A-B}$—is the longitudinal axis distance between slider Point A and transducer Point B;
  $d_C$—is the height of the crown; and
  l—is the length of the slider as illustrated in FIG. B.

Thus, the suspension assembly supporting a head is designed to provide a pitch angle $\theta_P$ which provides a substrate close point to limit damage to the transducer elements during head slap or shock. The head suspension assembly of the present invention as described limits wear of the encapsulating material of the transducer and reduces the thermal asperities for MR heads. The pitch angle should maintain the transducer elements in sufficient proximity to the disc surface for desired resolution.

Although the present invention has been described with reference to preferred embodiments, workers skilled in the art will recognize that changes may be made in form and detail without departing from the spirit and scope of the invention.

What is claimed is:

1. A head suspension assembly comprising:
   a head including:
      a slider including an upper surface and a lower bearing surface, a leading edge and a trailing edge;
      a transducer supported relative to the trailing edge of the slider and recessed a distance $d_R$ from the slider and the transducer including an elongated extent $d_{A-B}$ extending between a leading edge and a trailing edge of the transducer and the transducer including a transducer element supported along the elongated extent $d_{A-B}$; and
   a suspension assembly coupled to the head to support the head relative to a disc surface, said suspension assembly being adapted to support the head at a pitch angle relative to the disc surface so that a close point between the head and the disc surface is located at the slider spaced from the transducer and a height $h_B$ of the trailing edge of the transducer from the disc surface and a height $h_A$ of the trailing edge of the slider from the disc surface satisfies the relation $h_B \geq h_A$ so that the slider provides a contact interface between the head and the disc surface.

2. The head suspension assembly of claim 1 wherein the pitch angle $\theta_p$ satisifies the relationship $\theta_P < d_R/d_{A-B}$.

3. The head suspension assembly of claim 1 wherein the pitch angle $\theta_p$ at which the suspension assembly supports the head is determined based upon a crown of the slider.

4. The head suspension assembly of claim 3 wherein the pitch angle $\theta_p$ satisfies the relationship $\theta_P \leq d_R/d_{A-B} - 4d_C/l$ where: $d_C$ is a height dimension of the crown and l is a length of the slider.

5. The head suspension assembly of claim 3 wherein the pitch angle $\theta_p$ satisfies the relationship $\theta_P \leq (d_R - d_W)/d_{A-B} - 4d_C/l$ where: $d_W$ is a wear dimension for wear at the contact interface, $d_C$ is a height of the crown and l is a length of the slider.

6. The head suspension assembly of claim 1 wherein the pitch angle $\theta_p$ at which the suspension assembly supports the head is determined based upon wear at the contact interface of the head.

7. The head suspension assembly of claim 1 wherein the transducer includes an inductive transducer element.

8. The head suspension of claim 1 wherein the transducer includes a magnetoresistive transducer element.

9. A method for constructing a head suspension assembly for supporting a head relative to a disc surface comprising the steps of:
   providing a head including a slider having a leading edge, a trailing edge, and a bearing surface, the slider supporting a transducer at the trailing edge of the slider and the transducer recessed a distance $d_R$ from the slider and the transducer including an elongated extent having a distance $d_{A-B}$ extending between a leading edge and a trailing edge of the transducer and the transducer including a transducer element along the elongated extent $d_{A-B}$;
   calculating a pitch angle for the head so that a contact interface for the head and the disc surface is at the slider spaced from the transducer and a height $h_B$ of the trailing edge of the transducer from the disc surface and a height $h_A$ of the trailing edge of the slider from the disc surface satisfies the relation $h_B \geq h_A$; and
   coupling the head to a suspension assembly to support the head at the calculated pitch angle to form the head suspension assembly.

10. The method of claim 9 wherein the pitch angle is calculated based upon the pitch angle $\theta_p$ satisfies the relationship $\theta_P \leq d_R/(d_{A-B})$.

11. The method of claim 9 wherein the pitch angle $\theta_p$ is calculated based upon the pitch angle satisfies the relationship $\theta_P \leq d_R/d_{A-B} - 4d_C/l$ where: $d_C$ is a height dimension of a crown of the slider and l is a length of the slider.

12. The method of claim 9 wherein the pitch angle $\theta_p$ is calculated based upon the pitch angle satisfies the relationship $\theta_P \leq (d_R - d_W)/d_{A-B} - 4d_C/l$ where: $d_w$ is a wear dimension for wear at the contact interface of the slider and the disc surface, $d_C$ is a height of a crown of the slider and l is a length of the slider.

* * * * *

UNITED STATES PATENT AND TRADEMARK OFFICE
CERTIFICATE OF CORRECTION

PATENT NO. : 6,333,836 B1
DATED : December 25, 2001
INVENTOR(S) : Boutaghou et al.

It is certified that error appears in the above-identified patent and that said Letters Patent is hereby corrected as shown below:

Column 5,
Line 27, change "<" to -- $\leq$ --.

Signed and Sealed this

Thirty-first Day of May, 2005

JON W. DUDAS
*Director of the United States Patent and Trademark Office*